US 6,526,358 B1

(12) United States Patent
Mathews, Jr. et al.

(10) Patent No.: US 6,526,358 B1
(45) Date of Patent: Feb. 25, 2003

(54) MODEL-BASED DETECTION OF LEAKS AND BLOCKAGES IN FLUID HANDLING SYSTEMS

(75) Inventors: Harry Kirk Mathews, Jr., Clifton Park, NY (US); Anju Narendra, Beaverton, OR (US); Ravi Rajamani, West Hartford, CT (US); Bruce G. Norman, Charlton, NY (US); John Harry Down, Lanesboro, MA (US); Sal A. Leone, Glenville, NY (US); Jonathan Carl Thatcher, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/669,231

(22) Filed: Sep. 25, 2000

Related U.S. Application Data

(60) Provisional application No. 60/157,251, filed on Oct. 1, 1999.

(51) Int. Cl.⁷ ............................. G01F 1/00; G01F 23/00; G06F 19/00
(52) U.S. Cl. ............................. 702/51; 702/45; 702/50
(58) Field of Search ............................. 702/45, 50, 51, 702/98–99, 182–185, 189–191, 193; 60/39.02, 39.182; 141/59, 192

(56) References Cited

U.S. PATENT DOCUMENTS

| 5,089,978 | A | * | 2/1992 | Lipner et al. ................ 702/183 |
| 5,122,976 | A | * | 6/1992 | Bellows et al. ............. 702/185 |
| 5,132,920 | A | * | 7/1992 | Bellows et al. ............. 702/184 |
| 5,265,035 | A | * | 11/1993 | Reifman et al. ............ 702/185 |
| 5,577,377 | A |   | 11/1996 | Tomlinson |
| 5,839,267 | A |   | 11/1998 | Schonewald et al. |

OTHER PUBLICATIONS

"Model–Based Detection of Leaks and Blockages in Pipes", by Narendra, et al., Proceedings of ASME Turboexpo 2000, May 8–11, 2000, Munich Germany.

* cited by examiner

Primary Examiner—Bryan Bui
(74) Attorney, Agent, or Firm—Pierce Atwood

(57) ABSTRACT

A fault detection and isolation system for detecting leaks and blockages in a fluid handling system having at least one component through which fluid flows includes sensors for measuring fluid conditions upstream and downstream of the component. The sensors generate signals that are representative of the upstream and downstream fluid conditions and are fed to a control algorithm. The control algorithm uses the measured fluid conditions to generate estimates of an inlet state for the component and an outlet state for the component. The control algorithm also calculates innovation sequences for the estimated inlet and outlet states, and then compares the innovation sequences to predetermined thresholds to detect leaks and blockages.

23 Claims, 2 Drawing Sheets

MODEL-BASED DETECTION OF LEAKS AND BLOCKAGES IN FLUID HANDLING SYSTEMS

CROSS REFERENCE TO RELATED APPLICATIONS

This application claims the benefit of U.S. Provisional Application No. 60/157,251, filed Oct. 1, 1999.

BACKGROUND OF THE INVENTION

This invention relates generally to detecting leaks and blockages in a network of pipes and more particularly to detecting leaks and blockages in the steam cooling circuit of a gas turbine engine.

A gas turbine engine includes a compressor that provides pressurized air to a combustion section where the pressurized air is mixed with fuel and ignited for generating hot combustion gases. These gases flow downstream to a multi-stage turbine. Each turbine stage includes a plurality of circumferentially spaced apart blades or buckets extending radially outwardly from a wheel that is fastened to a shaft for rotation about the centerline axis of the engine. The hot gases expand against the turbine buckets causing the wheel to rotate. This in turn rotates the shaft that is connected to the compressor and may be also connected to load equipment such as an electric generator. Thus, the turbine extracts energy from the hot gases to drive the compressor and provide useful work such as generating electricity. One common application of a gas turbine engine is a combined cycle power generation system in which the exhaust of the gas turbine is used to generate steam in a heat recovery steam generator. This steam is used to drive a steam turbine to generate additional electricity.

It is well known that raising the turbine operating temperature can increase the efficiency of gas turbine engines. As operating temperatures are increased, the thermal limits of certain engine components, such as the turbine buckets, nozzles and shrouds, may be exceeded, resulting in reduced service life or even material failure. In addition, the increased thermal expansion and contraction of these components adversely affects clearances and their interfitting relationship with other components. Thus, it is common to provide cooling to such components to keep their temperatures within design limits.

In combined cycle power generation systems, it has recently been demonstrated that steam can be extracted from the heat recovery steam generator to cool the at risk components of the gas turbine engine. Typically, the extracted steam is passed through internal passages formed in the buckets, nozzles and shrouds of the first two turbine stages so as to remove heat therefrom. The heated steam is then returned to a different stage of the heat recovery steam generator or directly to the inlet of the steam turbine. Because the steam is heated in the cooling process and then used in the steam turbine, the overall thermal efficiency of the combined cycle power generation system is increased.

However, this steam cooling circuit, particularly the internal passages of the buckets, nozzles and shrouds, can be susceptible to leaks and blockages. A leak or blockage that deprives one or more of the turbine components of adequate coolant flow can result in failure of the affected components. It is thus desirable to provide the steam cooling circuit with leak and blockage detection so that preventative measures can be taken if a leak or blockage is detected. However, detecting leaks and blockages inside the turbine is difficult with conventional detection methods because pressure, temperature and flow measurements are not generally available inside the turbine.

Accordingly, there is a need for a system and method for detecting leaks and blockages using readily available external measurements.

BRIEF SUMMARY OF THE INVENTION

The above-mentioned need is met by the present invention which provides a fault detection and isolation system for detecting leaks and blockages in a fluid handling system having at least one component through which fluid flows. The fault detection and isolation system includes sensors for measuring fluid conditions upstream and downstream of the component. The sensors generate signals that are representative of the upstream and downstream fluid conditions and are fed to a control algorithm. The control algorithm uses the measured fluid conditions to generate estimates of an inlet state for the component and an outlet state for the component. The control algorithm also calculates innovation sequences for the estimated inlet and outlet states, and then compares the innovation sequences to predetermined thresholds to detect leaks and blockages.

The present invention and its advantages over the prior art will become apparent upon reading the following detailed description and the appended claims with reference to the accompanying drawings.

BRIEF DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
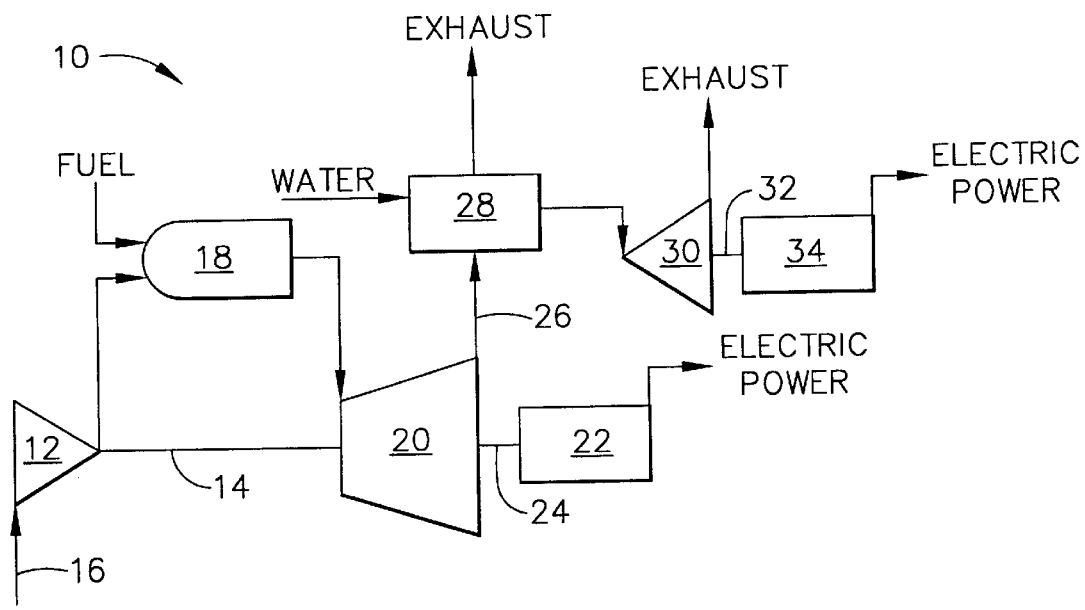
FIG. 1 is a schematic diagram of a combined cycle power generation system.

Referring to the drawings wherein identical reference numerals denote the same elements throughout the various views, FIG. 1 is a schematic diagram of a combined cycle power generation system 10. The combined cycle power generation system 10 includes a multi-stage axial flow compressor 12 having a rotor shaft 14. Air entering the compressor 12 at an inlet 16 is compressed thereby and then discharged to a combustor 18 where fuel is burned to provide high energy combustion gases that drive a turbine 20. In the turbine 20, the energy of the combustion gases is converted into work, some of which is used to drive the compressor 12 through the shaft 14. The remaining work drives a generator 22 by means of a rotor shaft 24 (which is typically an extension of the shaft 14) for producing electricity. The energy of the combustion gases that is not converted into work exits the turbine 20 at outlet 26 in the form of exhaust heat.

The combined cycle power generation system 10 converts the energy in the exhaust gases exiting the turbine outlet 26 into additional useful work. The exhaust gases are fed to a heat recovery steam generator (HRSG) 28 in which water is converted to steam in the manner of a boiler. The steam thus produced is discharged to a steam turbine 30 from which additional work is extracted via a rotor shaft 32 to drive a second generator 34, which in turn produces additional electricity. Alternatively, the gas turbine 20 and the steam turbine 30 could be arranged in a single shaft configuration to drive a common generator.

Figure 2:
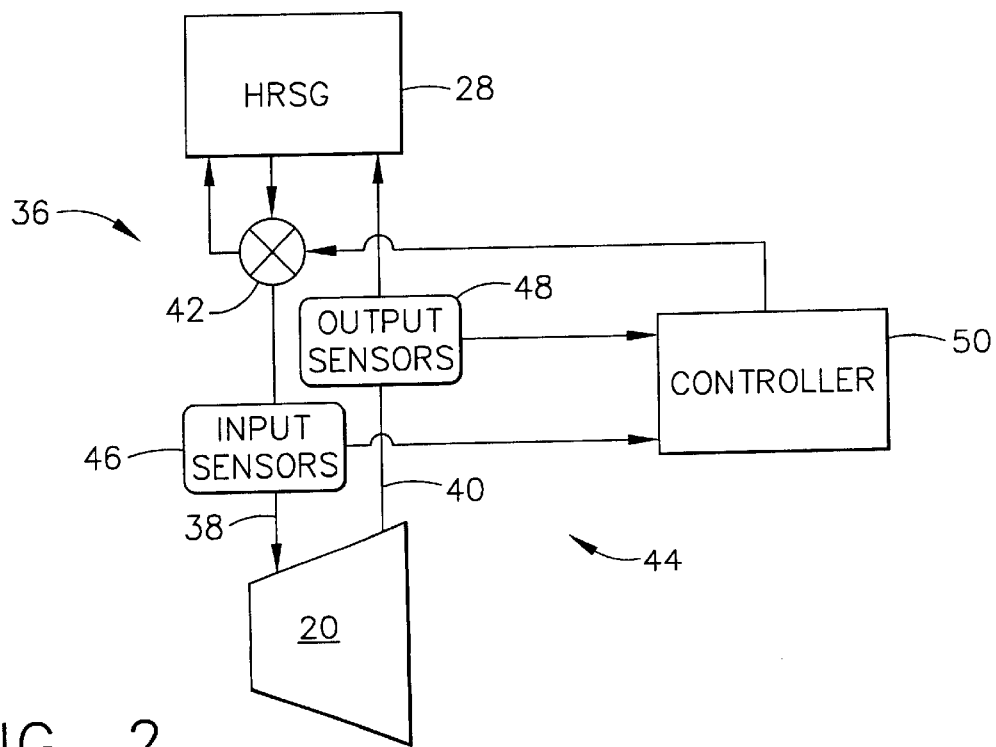
FIG. 2 is a schematic diagram of a fault detection and isolation system for use with a steam cooling circuit used in the combined cycle power generation system of FIG. 1.

Referring to FIG. 2, a steam cooling circuit 36 for use in the combined cycle power generation system 10 is shown schematically. In the steam cooling circuit 36, steam is extracted from the HRSG 28 and supplied to a coolant inlet 38 of the turbine 20. In a manner known in the art, this steam is then passed through internal passages formed in the turbine components (such as first and second stage turbine buckets, nozzles and shrouds) for which cooling is desired. As the steam passes through the hot turbine components, heat is transferred to the steam, thereby cooling the turbine components. The heated steam exits the turbine components and then the turbine 20 via a coolant outlet 40 of the turbine 20. From the coolant outlet 40, the heated steam is returned to the HRSG 28. Alternatively, the heated steam could be fed directly to the inlet of the steam turbine 30. A bypass valve 42 is provided between the HRSG 28 and the coolant inlet 38 for controlling the amount of steam that is supplied to the turbine 20. Steam extracted from the HRSG 28 that is not supplied to the turbine 20 by the bypass valve 42 is simply returned to the HRSG 28.

The power generation system 10 includes a fault detection and isolation (FDI) system 44 for detecting leaks and blockages in the steam cooling circuit 36. It is noted that although it is described herein as being used in conjunction with a steam cooling circuit of a power generation system, the FDI system 44 is not limited to this application. Indeed, the FDI system 44 can be used with a wide variety of piping or fluid handling systems.

The FDI system 44 includes input sensors 46, output sensors 48 and a controller 50. The input sensors 46 comprise a series of sensors arranged to measure (directly or indirectly) the pressure, temperature and flow rate of the steam entering the turbine 20 via the coolant inlet 38. Likewise, the output sensors 48 comprise a series of sensors arranged to measure (directly or indirectly) the pressure, temperature and flow rate of the steam exiting the turbine 20 via the coolant outlet 40. Thus, the input sensors 46 provide measurements of steam conditions upstream of the cooled turbine components, and the output sensors 48 provide measurements of steam conditions downstream of the cooled turbine components. Any collection of sensors capable of determining pressure, temperature and flow rate can be used for the input and output sensors 46, 48.

Figure 3:
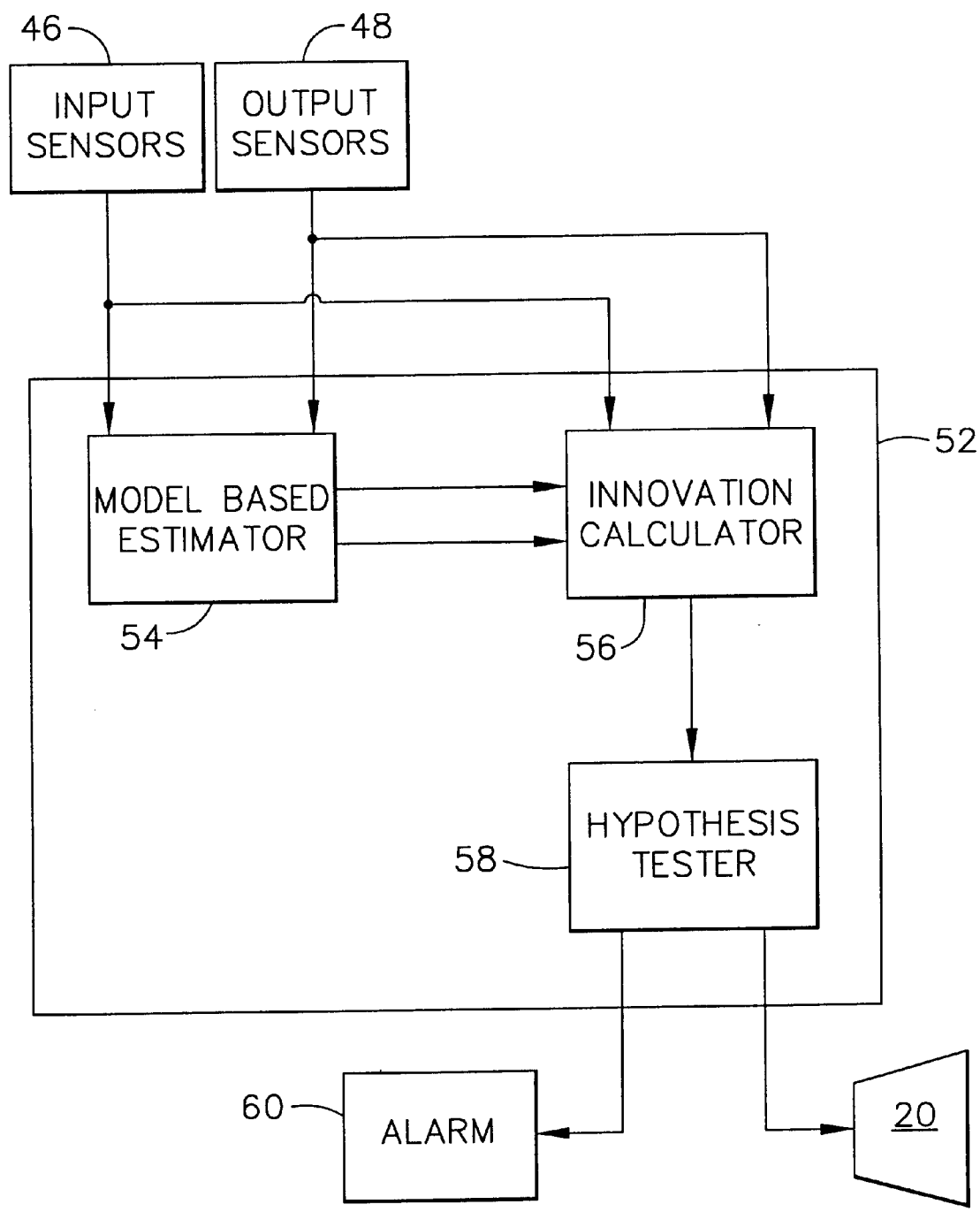
FIG. 3 is a schematic diagram of a fault detection and isolation algorithm used in the fault detection and isolation system of FIG. 2.

In a manner known in the art, the controller 50 performs the normal operations of a conventional controller for a power generation system including controlling the ratio of fuel and air supplied to the combustor 18 and regulating the flow of steam from the HRSG 28 to the steam turbine 30. The controller 50 also controls the bypass valve 42. In addition, the controller 50 includes an FDI algorithm for operating the FDI system 44. The FDI algorithm, which is shown schematically in FIG. 3 and represented by reference numeral 52, uses a model based estimator 54 to generate estimated "states" at the inlet and at the outlet of each component of the steam cooling circuit 36. The components of the steam cooling circuit 36 include the turbine buckets nozzles and shrouds through which the steam flows and the pipes and passages that carry the steam. In more general applications, the components would include the various components of a fluid handling system, such as pipes, valves and the like.

The model based estimator 54 receives signals representing input and output pressures, temperatures and flow rates from the input and output sensors 46, 48. In one embodiment, the model based estimator 54 uses these signals to estimate the inlet and outlet pressure states, $P_1$ and $P_2$, for each component. For this purpose, the model based estimator 54 is based on a nonlinear pressure model that includes transient dynamics and is constructed in the form of an extended Kalman filter and implemented with steady state gains.

Specifically, two estimates are calculated at each sampling time kT, the propagated states, $P_{1,prop}$ and $P_{2,prop}$ (also known as the time updates) and the completely estimated states, $P_{1,est}$ and $P_{2,est}$ (also known as the measurement updates). The sampling time kT, which represents the time increments at which the state estimates are generated, is the product of the sampling time instance k and the sampling time frequency T.

The derivatives of the pressure states at time kT are given by equations:

$$\frac{dP_1}{dt}(k) = \frac{k_1}{V_1}(W_{in}(k) - W_c(k)) \quad (1)$$

$$\frac{dP_2}{dt}(k) = \frac{k_2}{V_2}(W_c(k) - W_{out}(k))$$

where $k_1$ and $k_2$ are known proportionality constants, $V_1$ and $V_2$ are known volumes between the component and the inlet sensors 46 and the outlet sensors 48, respectively, $W_{in}$ is the component inlet flow rate (measured by input sensors 46) and $W_{out}$ is the component outlet flow rate (measured by output sensors 48), and where kT has been replaced by k, since the meaning is unambiguous. The term $W_c$ is the apparent flow rate through the component and is calculated by:

$$W_c(k) = f_2((P_{1,est}(k) - P_{2,est}(k), T_0(k), T_1(k), A_c),$$

where $f_2$ is a known nonlinear function for the component, $T_0$ is inlet temperature measured by the input sensors 46, $T_1$ is the outlet temperature measured by the output sensors 48, $A_c$ is the effective area of the component, which is known, and the state estimates $P_{1,est}$ and $P_{2,est}$ are known from the previous time step. With the derivatives known from equation (1), a simple approximation gives the propagated state estimates $P_{1,prop}$ and $P_{2,prop}$ at the subsequent time step k+1:

$$P_{1,prop}(k+1) = P_{1,est}(k) + T\frac{dP_1}{dt}(k) \quad (2)$$

$$P_{2,prop}(k+1) = P_{2,est}(k) + T\frac{dP_2}{dt}(k).$$

The completely estimated states, $P_{1,est}$ and $P_{2,est}$ for the time step k+1 are obtained by correcting the propagated states with the pressure measurements from the input and output sensors 46, 48 as follows:

$$P_{1,est}(k+1) = P_{1,prop}(k+1) + K_{11}(P_1(k+1) - P_{1,prop}(k+1)) + K_{12}(P_2(k+1) - P_{2,prop}(k+1))$$

$$P_{2,est}(k+1) = P_{2,prop}(k+1) + K_{21}(P_1(k+1) - P_{1,prop}(k+1)) + K_{22}(P_2(k+1) - P_{2,prop}(k+1))$$

where $K_{11}$, $K_{12}$, $K_{21}$ and $K_{22}$ are the Kalman gains for the system. The completely estimated states, $P_{1,est}$ and $P_{2,est}$ for the time step k+1 are used in equation (2) when determining the propagated states, $P_{1,prop}$ and $P_{2,prop}$ for the next time step k+2. While theory holds that the Kalman gains are time-varying, the present inventors have found that they converge to constants very rapidly in this application, so they are determined a priori and used as constants. This simplifies the algorithm considerably without appreciable loss of performance.

The propagated states, $P_{1,prop}$ and $P_{2,prop}$ thus generated by the model based estimator 54 represent estimates of the inlet and outlet pressure states, $P_1$ and $P_2$ for each component. In another embodiment, the model based estimator 54 estimates the inlet and outlet flow states, $W_{in}$, and $W_{out}$, for each component instead of the inlet and outlet pressure states. In this case, the model based estimator 54, which still receives the signals representing input and output pressures, temperatures and flow rates from the input and output sensors 46, 48, is based on a nonlinear component flow model and incorporates flow dynamics corrections to compensate for transient conditions. Specifically, propagated state estimates $W_{in,prop}$ and $W_{out,prop}$ are given by $$W_{in,prop}(k) = W_c(k) + W_{in\_dyn}(k)$$
$$W_{out,prop}(k) = W_c(k) - W_{out\_dyn}(k) \quad (3)$$

The term $W_c$ is the calculated flow rate based on the model:

$$W_c(k) = f_2((P_1(k) - P_2(k), T_0(k), T_1(k), A_c),$$

where $f_2$ is a known nonlinear function for the component, $T_0$ is inlet temperature measured by the input sensors 46, $T_1$ is the outlet temperature measured by the output sensors 48, $A_c$ is the effective area of the component, which is known, and $P_1$ and $P_2$ are the measured pressures. The terms $W_{in\_dyn}$ and $W_{out\_dyn}$ are included to account for the flow dynamics during transient conditions resulting from the volumes before and after the component. These terms are computed from the differentiated pressure measurements, $dP_1/dt$ and $dP_2/dt$ as $$W_{in\_dyn}(k) = \frac{dP_1}{dt}(k)\frac{V_1}{k_1}$$

$$W_{out\_dyn}(k) = \frac{dP_2}{dt}(k)\frac{V_2}{k_2}$$

where $k_1$ and $k_2$ are known proportionality constants, $V_1$ and $V_2$ are known volumes between the component and the inlet sensors 46 and the outlet sensors 48, respectively, and the differentiated pressure measurements $P_{1dot}$ and $P_{2dot}$ are found by numerically differentiating the measured inlet and outlet pressures.

The FDI algorithm 52 further includes a innovation calculator 56 and a hypothesis tester 58. In the pressure state model embodiment, signals representative of the propagated states, $P_{1,prop}$ and $P_{2,prop}$ are fed to the innovation calculator 56. The innovation calculator 56 also receives signals from the input and output sensors 46, 48 representative of the measured inlet and outlet pressures. The innovation calculator 56 calculates the "error" in the propagated state estimates, $P_{1,prop}$ and $P_{2,prop}$, which is called the innovation sequence and given by:

$$innov(k+1) \equiv \begin{pmatrix} P_1(k+1) - P_{1,prop}(k+1) \\ P_2(k+1) - P_{2,prop}(k+1) \end{pmatrix} \quad (4)$$

where the propagated states, $P_{1,prop}$ and $P_{2,prop}$ are derived from equation (2) and $P_1$ and $P_2$ are given by the measured pressures. Because the pressure drops between the component and the coolant inlet and outlet 38, 40 due to friction are tiny compared to the pressure drop in the component itself, they are neglected. It is thus assumed that the measured pressures are the same as the pressures at the inlet and outlet of the component.

In the flow state model embodiment, signals representative of the propagated states, $W_{in,prop}$ and $W_{out,prop}$ derived from equation (3) are fed to the innovation calculator 56. The innovation calculator 56 also receives signals from the input and output sensors 46, 48 representative of the measured inlet and outlet flow rates. The innovation calculator 56 then calculates the innovation sequence in this embodiment as:

$$innov(k) \equiv \begin{pmatrix} W_{in}(k) - W_{in,prop}(k) \\ W_{out,prop}(k) - W_{out}(k) \end{pmatrix} \quad (5)$$

The innovation sequence calculated by the innovation calculator 56 (whether using equation (4) or equation (5)) is fed to the hypothesis tester 58. The hypothesis tester 58 utilizes a multiple hypothesis statistical test to detect and isolate leaks and blockages. Specifically, the hypothesis tester 58 uses a Bayesian likelihood ratio test to select the hypothesis most likely to be true given the current value of the innovation vector. The hypothesis tester 58 first averages the innovations using a window (with a size of about 1 second), and uses the result to perform a multiple hypothesis test. Four preferred hypotheses are:

| | |
|---|---|
| $H_0$: | No fault, |
| $H_1$: | Leak before component, |
| $H_2$: | Leak after component, |
| $H_3$: | Blockage. |

One element in determining the highest probability hypothesis is the likelihood function evaluated using the current innovation vector. The likelihood function is a relative measure of the likelihood that the observed innovation came from each of the four probability distributions associated with the hypotheses. In a Bayesian likelihood ratio test, the likelihood function is coupled with some initial knowledge (a priori information) as to the probability of a fault occurring ($P_{ap}(H_i)$), to calculate the probability that a particular fault has occurred (the a posteriori conditional probability). The maximum computed probability isolates the fault.

The hypothesis tester 58 calculates a function of the innovation sequence and compares that with a threshold. This function is called a sufficient, or test, statistic. In the present case, a test statistic $Ts_i$ is defined for each of the four hypotheses as:

$$Ts_i(k) = \frac{\log_n(P_{ap}(H_i))}{N} + \left(\overline{innov}(k) - \frac{S_i}{2}\right)^T C^{-1} S_i, \quad (6)$$

(for i=0, 1, 2, 3), where $S_i$ is the mean value of each hypothesis innovation vector, N is the number of samples taken, and the bar denotes an N point time average. The covariance matrix C of the innovation sequence is defined as:

$$C = E(innov(k)innov(k)^T),$$

with E denoting the expected value. As in the case of the Kalman gains, the covariance matrix of the innovation sequence converges rapidly to a constant matrix and a constant C can thus be used in equation (6). For an application where this convergence is not immediate, both the Kalman gain and the innovations covariance matrix can be updated iteratively at each sample time. The thresholds are incorporated into the test statistic via the mean values of each hypothesis innovation vector, $S_i$, which are defined, for each threshold $\lambda_i$. For the pressure state model embodiment, the hypothesis innovation vectors $S_i$ relate to the threshold values as:

$$S_0 = \begin{pmatrix} 0 \\ 0 \end{pmatrix}, \qquad S_1 = 2T\begin{pmatrix} -\frac{k_1}{V_1} \\ 0 \end{pmatrix}\lambda_1, \qquad (7)$$

$$S_2 = 2T\begin{pmatrix} 0 \\ -\frac{k_2}{V_2} \end{pmatrix}\lambda_2, \quad \text{and} \quad S_3 = 2T\begin{pmatrix} \frac{k_1}{V_1} \\ -\frac{k_2}{V_2} \end{pmatrix}\lambda_3$$

For the flow state model embodiment, the hypothesis innovation vectors $S_i$ relate to the threshold values as:

$$S_0 = \begin{pmatrix} 0 \\ 0 \end{pmatrix}, \; S_1 = \begin{pmatrix} 2\lambda_1 \\ 0 \end{pmatrix}, \; S_2 = \begin{pmatrix} 0 \\ 2\lambda_2 \end{pmatrix}, \; \text{and } S_3 = \begin{pmatrix} -2\lambda_1 \\ 2\lambda_2 \end{pmatrix} \qquad (8)$$

The thresholds $\lambda_i$ are physical values specified by the user based on design and performance considerations. Leak thresholds are easy to define based on design considerations. Blockage, on the other hand, is not as straightforward. Blockage is defined herein as a reduction in the mass flow rate through the component as a percentage of the maximum amount the component can flow at the given pressures and temperatures. Other metrics, such as reduction in effective area, might be a more natural way of specifying blockage threshold, but as far as the performance of the FDI algorithm 52 is concerned it makes no difference, since all thresholds are transformed into equivalent pressure units as shown in equations (7) and (8) above.

Two threshold levels can be utilized: an alarm level that triggers an alarm 60 when exceeded, and a higher trip level that causes the turbine 20 to be shut down when exceeded. The test statistic equations are evaluated separately for these two levels, with the most likely hypothesis in each of these categories reported.

At each sampling time, the test statistic, $Ts_i$, for each of the four hypotheses is evaluated using the latest value of the averaged innovation vector, and the FDI algorithm 52 selects the hypothesis that has largest positive value to detect and isolate faults. That is, hypotheses $H_0$ having the highest positive valve would be indicative of no fault, hypotheses $H_1$ having the highest positive valve would be indicative of a leak before the component, and so on. The FDI algorithm 52 is thus able to detect leaks and blockages that are much smaller than could be detected by simply taking the difference between the inlet and outlet flow rates.

The foregoing has described a system and method for detecting leaks and blockages in fluid handling systems. The present invention includes a control algorithm that utilizes a model of the fluid handling system behavior to predict fluid conditions and combines these predictions with measured fluid conditions to generate composite estimates of the fluid conditions. In addition, the control algorithm computes an innovation sequence, which is derived from the difference between the measured and predicted fluid conditions. The control algorithm then performs hypothesis testing on the innovation sequence against specified thresholds to detect and isolate faults. Two different implementations, one based on a pressure state model and one based on a flow state model, have been developed.

While specific embodiments of the present invention have been described, it will be apparent to those skilled in the art that various modifications thereto can be made without departing from the spirit and scope of the invention as defined in the appended claims.

What is claimed is:

1. A fault detection and isolation system for detecting leaks and blockages in a fluid handling system having at least one component through which fluid flows, said fault detection and isolation system comprising:

means for measuring fluid conditions upstream of said component;

means for measuring fluid conditions downstream of said component;

means for generating estimates of an inlet state for said component and an outlet state for said component;

means for calculating innovation sequences for said estimated inlet and outlet states; and means for comparing said innovation sequences to predetermined thresholds to detect leaks and blockages.

2. The fault detection and isolation system of claim 1 wherein said means for measuring fluid conditions upstream of said component generates signals representing fluid pressure, temperature and flow rate upstream of said component and said means for measuring fluid conditions downstream of said component generates signals representing fluid pressure, temperature and flow rate downstream of said component.

3. The fault detection and isolation system of claim 2 wherein said means for generating estimates receives said signals representing fluid pressure, temperature and flow rate upstream of said component and said signals representing fluid pressure, temperature and flow rate downstream of said component.

4. The fault detection and isolation system of claim 2 wherein said means for generating estimates generates estimates of an inlet pressure state for said component and an outlet pressure state for said component.

5. The fault detection and isolation system of claim 4 wherein said means for calculating innovation sequences receives said signals representing fluid pressure upstream of said component and fluid pressure downstream of said component and signals from said means for generating estimates representing said estimated inlet and outlet pressure states.

6. The fault detection and isolation system of claim 2 wherein said means for generating estimates generates estimates of an inlet flow state for said component and an outlet flow state for said component.

7. The fault detection and isolation system of claim 6 wherein said means for calculating innovation sequences receives said signals representing flow rate upstream of said component and flow rate downstream of said component and signals from said means for generating estimates representing said estimated inlet and outlet flow states.

8. The fault detection and isolation system of claim 1 wherein said means for generating estimates is based on a Kalman filter.

9. The fault detection and isolation system of claim 1 wherein said means for comparing utilizes a multiple hypothesis statistical test to detect and isolate leaks and blockages.

10. For use with a gas turbine having a plurality of components and a steam cooling circuit for cooling said components, a fault detection and isolation system for detecting leaks and blockages in said steam cooling circuit, said fault detection and isolation system comprising:

input sensors for measuring the pressure, temperature and flow rate of steam entering said gas turbine, said input sensors generating signals representing said pressure, temperature and flow rate of steam entering said gas turbine;

output sensors for measuring the pressure, temperature and flow rate of steam exiting said gas turbine, said output sensors generating signals representing said pressure, temperature and flow rate of steam exiting said gas turbine;

means for generating estimates of an inlet state for at least one of said components and an outlet state for said at least one component;

means for calculating innovation sequences for said estimated inlet and outlet states; and means for comparing said innovation sequences to predetermined thresholds to detect leaks and blockages in said steam cooling circuit.

11. The fault detection and isolation system of claim 10 wherein said means for generating estimates receives said signals representing said pressure, temperature and flow rate of steam entering said gas turbine and said signals representing said pressure, temperature and flow rate of steam exiting said gas turbine.

12. The fault detection and isolation system of claim 10 wherein said means for generating estimates generates estimates of an inlet pressure state for said component and an outlet pressure state for said component.

13. The fault detection and isolation system of claim 12 wherein said means for calculating innovation sequences receives said signals representing pressure of steam entering said gas turbine and pressure of steam exiting said gas turbine and signals from said means for generating estimates representing said estimated inlet and outlet pressure states.

14. The fault detection and isolation system of claim 10 wherein said means for generating estimates generates estimates of an inlet flow state for said component and an outlet flow state for said component.

15. The detection and isolation system of claim 14 wherein said means for calculating innovation sequences receives said signals representing flow rate of steam entering said gas turbine and flow rate of steam exiting said gas turbine and signals from said means for generating estimates representing said estimated inlet and outlet flow rate states.

16. The fault detection and isolation system of claim 10 wherein said means for generating estimates is based on a Kalman filter.

17. The fault detection and isolation system of claim 10 wherein said means for comparing utilizes a multiple hypothesis statistical test to detect and isolate leaks and blockages.

18. A method of detecting and isolating leaks and blockages in a fluid handling system having at least one component through which fluid flows, said comprising the steps of:

measuring fluid conditions upstream of said component;

measuring fluid conditions downstream of said component;

using said upstream and downstream fluid conditions to generate estimates of an inlet state for said component and an outlet state for said component;

calculating innovation sequences for said estimated inlet and outlet states; and comparing said innovation sequences to predetermined thresholds to detect leaks and blockages.

19. The method of claim 18 wherein said step of measuring fluid conditions upstream of said component comprises measuring fluid pressure, temperature and flow rate upstream of said component and said step of measuring fluid conditions downstream of said component comprises measuring fluid pressure, temperature and flow rate downstream of said component.

20. The method of claim 19 wherein said step of using said upstream and downstream fluid conditions to generate estimates comprises generating estimates of an inlet pressure state for said component and an outlet pressure state for said component.

21. The method of claim 20 wherein said innovation sequences are calculated using said upstream and downstream fluid pressures and said estimated inlet and outlet pressure states.

22. The method of claim 19 wherein said step of using said upstream and downstream fluid conditions to generate estimates comprises generating estimates of an inlet flow state for said component and an outlet flow state for said component.

23. The method of claim 22 wherein said innovation sequences are calculated using said upstream and downstream flow rates and said estimated inlet and outlet flow rate states.

\* \* \* \* \*

UNITED STATES PATENT AND TRADEMARK OFFICE
CERTIFICATE OF CORRECTION

PATENT NO. : 6,526,358 B1
DATED : February 25, 2003
INVENTOR(S) : Harry Kirk Mathews, Jr. et al.

It is certified that error appears in the above-identified patent and that said Letters Patent is hereby corrected as shown below:

<u>Title page,</u>
Item [*] Notice, delete the phrase "by 0 days" and insert -- by 56 days --

Signed and Sealed this

Fifth Day of October, 2004

JON W. DUDAS
*Director of the United States Patent and Trademark Office*